July 21, 1931.  J. B. MILLS  1,815,722
INDICATOR
Filed Jan. 23, 1924   2 Sheets-Sheet 1
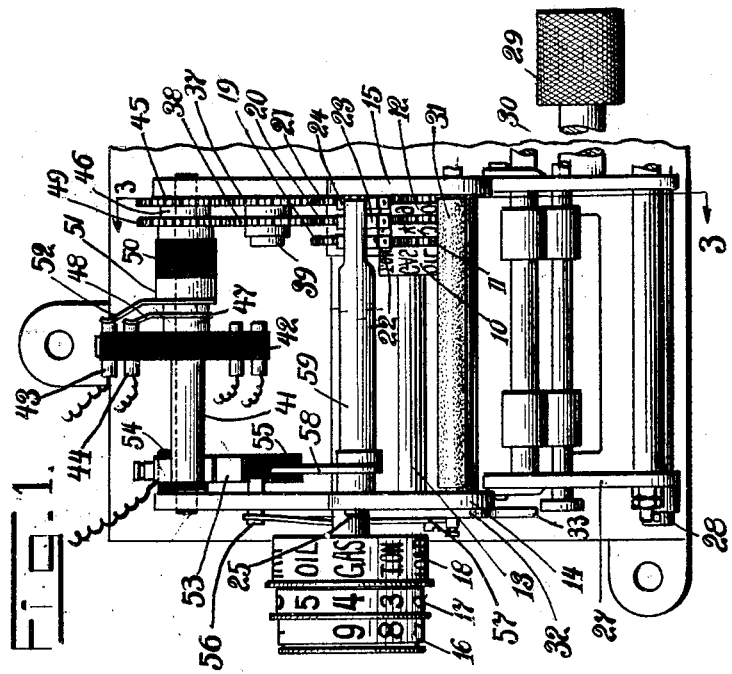
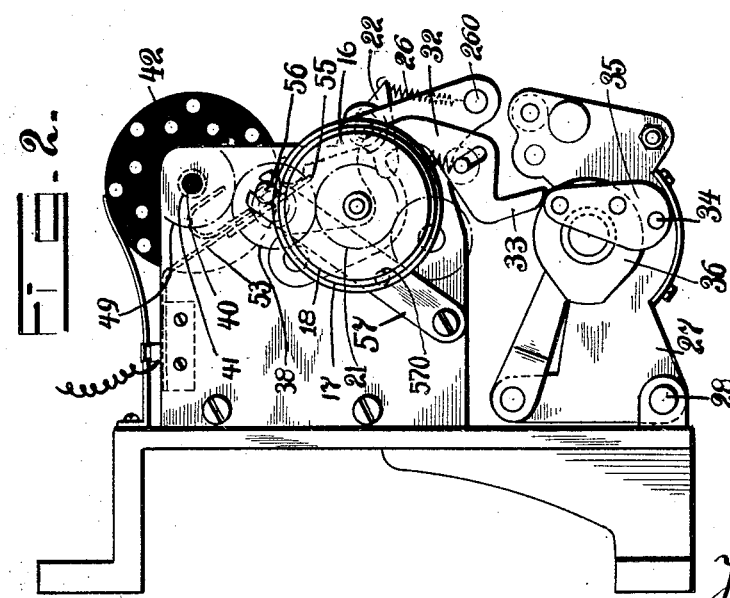
Inventor
John B. Mills
By Edward F. Reed
Attorney July 21, 1931.    J. B. MILLS    1,815,722
INDICATOR
Filed Jan. 23, 1924    2 Sheets-Sheet 2
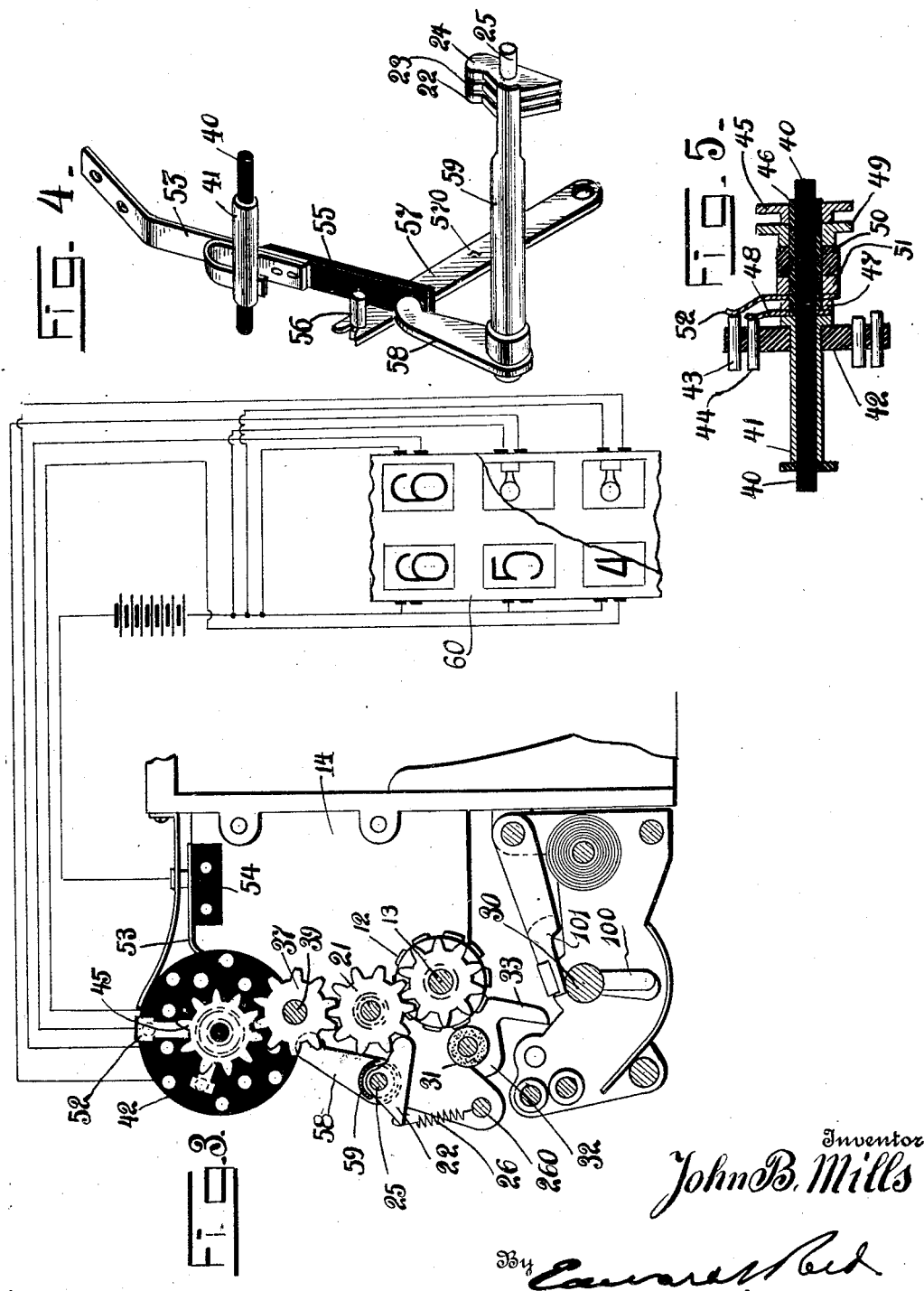

Patented July 21, 1931

1,815,722

UNITED STATES PATENT OFFICE

JOHN B. MILLS, OF DAYTON, OHIO, ASSIGNOR TO OHMER FARE REGISTER COMPANY, OF DAYTON, OHIO

INDICATOR

Application filed January 23, 1924. Serial No. 688,043.

This invention relates to an indicator and more particularly to means for controlling said indicator from a registering device in such a way that the indicator furnishes an indication of the item which is registered.

One object of the invention is to provide means associated with a registering device, adapted to register a selected one of a plurality of items, which will indicate the item registered at the time that the registration is made.

A further object of the invention is to provide means associated with the item selecting means in the registering device for selecting the corresponding item in the indicator.

A further object of the invention is to provide means associated with the item selecting means in the registering device which will efface the indication upon the indicator upon a subsequent movement of said item selecting means.

A further object of the invention is to provide, in connection with a registering device, an illuminated indicator which will be so controlled by the registering operation that it will cause to be exhibited the particular designation of the indicator which corresponds to that designation on the registering device which has been moved to registering position.

A further object of the invention is to provide electrical means for controlling an indicator, which will comprise a series of contacts, one of which will be selected by the item selecting means, and will be connected with a source of electrical energy by the operation of taking a record from said registering device, this connection being broken by any subsequent movement of the item selecting means.

A further object of the invention is to provide an indicator controlling device comprising in part a device actuated by the movement of a yieldable detent, the primary purpose of which is to yieldingly hold a wheel in certain positions.

Other objects of the invention will appear as the mechanism is described in detail.

In the drawings Fig. 1 is a front elevation of a portion of an automobile service recorder showing my invention applied thereto; Fig. 2 is a left end elevation of the same; Fig. 3 is a section on the line 3—3 of Fig. 1 looking in the direction indicated, and showing one form of indicator and a wiring diagram; Fig. 4 is a perspective view of a switch operating device; Fig. 5 is a transverse section through the individual contact selecting device.

The invention may take various forms and may be associated with registering devices of various kinds, either visual or recording. For the purpose of illustration, but with no intention of limiting my invention to its application thereto, the invention will be herein described as applied to an automobile service recorder of the type disclosed in Patent No. 1,360,567, November 30, 1920, to Ohmer and Ohmer. The patent referred to describes an instrument the object of which is to furnish the owner of vehicles, such as motor trucks and passenger busses with a printed record of various items necessary for keeping a proper account of the performances of the vehicle and the expenses incident thereto. The record supplied by this instrument comprises the mileage the vehicle has run at the time the record is made, the date, the time the record was taken, identification of the person taking the record and various miscellaneous data which is adapted to be set up by the person taking the record. For example, when the gas tank is filled, it is important to know at what time this was done and the quantity of gas which was secured. Accordingly, the driver will set certain manually operable drums to indicate the word "Gas", and the number of gallons of gas which were put in the tank. Likewise it will be obvious that when the device is mounted on a passenger vehicle it may be used to register the number of passengers on board and when so used the indicator would be so arranged that it would be visible to the passengers or to an inspector, as is customary in passenger registering devices. Other items of information are similarly recorded.

As described in the patent to Ohmer et al. above referred to, this service recorder comprises series of type wheels, three of which are shown at 10, 11 and 12, as loosely mounted on a shaft 13 which is supported in frame plates 14 and 15. The various type wheels may be actuated in any suitable manner to effect the registration of the several items, but the three type wheels here shown are manually operated, and to this end setting drums 16, 17 and 18 are mounted exteriorly of the recorder and are connected respectively, preferably by means of telescopic shafts, with gears 19, 20, and 21 which mesh with gears rigid with the type wheels. For the purpose of retaining the type wheels in correct positions, detents 22, 23 and 24 loosely mounted on a rod 25 are provided, these detents being held in engagement with the teeth of the corresponding actuating gears by means of springs 26 fastened to rod 260. The printing mechanism is mounted between end plates, one of which is shown at 27, pivoted to a rod 28. All the functions incident to printing are carried out on a single rotation of a printing handle 29 which is rigid with a shaft 30 carrying cam 100 which operates the platen 101. For the purpose of inking the type wheels previous to printing, an inking roller 31 is mounted in arms, one of which is shown at 32, pivoted to the frame plate 14 and having an extension 33 which is engaged by a pin 34 in an arm 35 mounted on a cam plate 36 rigid with the printer shaft. The other operations incident to printing, such as the movement of the platen, will not be described since they have no bearing on the present invention. The machine as thus far described is identical to that shown in the patent to Ohmer et al. above referred to.

It is one of the objects of the present invention to provide means for selecting an indication which shall correspond to the item which is registered, and which, in the case of the recorder, is to be printed. Various mechanisms may be used for this purpose. The one which I have selected for the purpose of illustration comprises gears 37 and 38 in mesh with the gears 21 and 20 which actuate the type wheels. Gears 20 and 21 are manually operated by means of the setting drums 17 and 16 respectively but it will be understood that a similar gear could be operated from the actuating gears for any registering or type wheel in the machine. Gears 37 and 38 are loosely mounted on the stud shaft 39 supported in the frame plate 15. In the present embodiment of my invention the indicator is electrically illuminated and the selecting device comprises a circuit breaker and closer which is controlled by the registering operation to secure the illumination of that designation of the indicator which corresponds to the item registered. As here shown, a rod 40 of insulating material is supported in the frame plates 14 and 15, and upon this rod is a metallic sleeve 41 which carries near one end thereof a disk 42 of insulating material. The disk 42 carries two series of contacts 43 and 44, here shown as pins extending through the disk and each having one end adapted to be connected with a circuit and its other end adapted to constitute a contact point. More or less contacts may be used, the specific device shown being merely illustrative. Each of the contacts 43 and 44 forms part if a separate circuit through a corresponding designation of the indicator which may be located in any convenient position. In the present embodiment of my invention, the contacts 43 are for the tens order of a number and contacts 44 are for the units order of a number, it being understood that the indicator may contain other data than numbers. For the purpose of selecting a contact 44 corresponding to the items which has been registered on type wheel 12, the gear 37, which it will be remembered is rotated from the gear 21 which actuates the type wheel 12, meshes with a gear 45 which is fixed to one end of a sleeve 46 of insulating material, (Fig. 5), which sleeve encircles the rod 40. At the opposite end of sleeve 46 is a metallic collar 47 carrying a spring arm 48 adapted to make contact with any of the contacts 44. Similarly, gear 38 meshes with a gear 49 attached to a sleeve of insulating material 50 which encircles the sleeve 46. At the opposite end of the sleeve 50 is a metallic collar 51 which carries a contact arm 52 adapted to engage any of the contacts 43. It will be seen that sleeve 41, collars 47 and 51 and arms 48 and 52 are all in electrical contact with each other but are insulated from all other parts of the machine. Current is supplied to the contact arms through the sleeve 41 by means of a spring switch 53, which may be connected with any suitable source of electrical energy and which is mounted on a block of insulating material 54 supported from the frame plate 14. Switch 53 is spring pressed toward the sleeve 41, with which it is adapted to make contact, but it is not desirable that the circuit should be closed while the type wheels and the corresponding contact arm are being moved from one position to another. Accordingly, the spring switch 53 is held out of contact with the sleeve 41 until the printer shaft is rotated to cause a record to be taken from the type wheels. To accomplish this the blade of the switch 53 is provided with an extension 55, preferably in the form of a strip of insulating material, and a pin 56 extends through an opening in the frame plate 14 and engages the upper side of this strip of insulating material, thus holding the switch 53 open until the said pin is withdrawn by means of a spring arm 57 (see Fig. 1) mounted on the frame plate 14 and engaging a groove in pin 56. The spring arm 57 crosses the arm 32 which supports the inking roll, and has a projection 570 on its inner side which is engaged by the arm 32, when said arm is oscillated in the operation of inking the type, thus camming the spring arm to the left as viewed in Fig. 1 and withdrawing the pin 56 from the path of the extension 55. The switch 53, thus released, moves into engagement with the sleeve, the end of the pin 56 rests against the edge of extension 55, and the indicator is accordingly energized. The switch remains closed until the extension 55 is again depressed. The first subsequent movement of any of the type wheel setting devices will move the switch out of engagement with the sleeve and depress the same sufficiently to enable the pin 56 to move into position above the extension 55. An arm 58 adapted to engage the extension 55 is rigidly attached to one end of a sleeve 59 which encircles the rod 25. An extension at the opposite end of this sleeve overlies the series of detents 22, 23 and 24 and is so arranged that when any detent is moved outward by the rotation of the gear with which it is in contact, the sleeve will be rotated slightly and the arm 58 will depress the insulating strip 55 sufficiently to open the switch and permit spring 57 to restore pin 56 to holding position.

The circuits closed by the contact arm and the contacts mounted in the insulating disk may control the operation of the indicator in any desired way. In the present instance, the indicator is controlled by illumination and for the purpose of illustration, I have herein shown a simple form of indicator at 60 in Fig. 3. This indicator comprises two rows of digits corresponding to the two series of contacts, eight in number, the digits being made translucent on a background of opaque material. Each of the circuits from the contacts 43 and 44 in the recorder includes a small lamp back of the proper digit in the indicator. The selected lamps, one in each row of digits, are lighted when the printing mechanism is operated to make the record, and are extinguished by any subsequent setting movement of the setting devices.

While I have shown and described one embodiment of my invention I wish it to be understood that I do not desire to be limited to the details thereof as various modifications may appear to a person skilled in the art.

Having now fully described my invention, what I claim as new and desire to secure by Letters Patent is:

1. In combination, an indicating device comprising a plurality of electric circuits, a single contact device adapted to connect with any one of said circuits, a setting device for said contact device, a source of current supply including a switch, a spring tending to close said switch, a detent device for retaining said switch open, an operating element, means by which said operating element disables said detent device thereby closing said switch, and means whereby a subsequent movement of said setting device opens said switch and again renders said detent device effective.

2. In combination, a circuit controlling device comprising an insulating rod, a conducting sleeve mounted thereon, a disk of insulating material supported on said sleeve, a plurality of contacts carried by said disk, a contact arm adapted to separately engage each of said contacts, means whereby said arm is rotated so as to contact with any of said contacts, an indicator, and means to designate on said indicator the position of said arm relative to said contacts.

3. In combination, an indicator controlling device comprising a rod of insulating material, a conducting sleeve mounted thereon, a disk of insulating material supported on said sleeve, a plurality of series of contacts on said disk, each forming a part of a circuit through said indicator, a plurality of contact arms in electrical connection with said sleeve, each adapted to traverse one of said series of contacts, means whereby said arms are rotated so as to contact with any of said contacts, an indicator, and means to designate on said indicator the position of said arms relative to said contacts.

4. In combination, an indicator controlling device comprising a rod of insulating material, a conducting sleeve mounted thereon, a disk of insulating material supported on said sleeve, a plurality of series of contacts on said disk, each forming a part of a circuit through said indicator, a plurality of contact arms in electrical connection with said sleeve, each adapted to traverse one of said series of contacts, a plurality of sleeves of insulating material telescopically arranged and supporting respectively said plurality of contact arms, means whereby said arms are rotated so that each arm may contact with any one of the contacts of its series, an indicator, and means to designate on said indicator the positions of said arms relative to said contacts.

5. In combination, an indicator controlling device comprising a rod of insulating material, a conducting sleeve mounted thereon, a disk of insulating material supported on said sleeve, a plurality of series of contacts on said disk, each forming a part of a circuit through said indicator, a plurality of contact arms in electrical connection with said sleeve, each adapted to traverse one of said series of contacts, a plurality of sleeves of insulating material telescopically arranged and supporting respectively said plurality of contact arms, a plurality of gears associated respectively with said sleeves, and a plurality of settable devices associated respectively with said gears.

6. In combination, an indicator controlling device comprising a rod of insulating material, a conducting sleeve mounted thereon, a disk of insulating material supported on said sleeve, a plurality of series of contacts on said disk, each forming a part of a circuit through said indicator, a plurality of contact arms in electrical connection with said sleeve, each adapted to traverse one of said series of contacts, a plurality of sleeves of insulating material telescopically arranged and supporting respectively said plurality of contact arms, a plurality of gears associated respectively with said sleeves, a plurality of manually operable setting devices adapted to rotate said gears.

7. In a machine of the type described, a disk of insulating material bearing a plurality of series of contacts, a plurality of contact arms adapted to engage respectively said series of contacts, an insulated conducting element in electrical connection with said contact arms, and a driving gear rigid with but insulated from each of said contact arms.

8. In a machine of the character described, an item wheel, operating means therefor, a yieldable detent device associated therewith, a contact arm adapted to be rotated concomitantly with said item wheel, a conducting element in electrical contact with said contact arm, a current carrying switch adapted to make contact with said conducting element, means for retaining said switch out of contact with said conducting element, an operating mechanism, means associated with said operating mechanism for disabling said retaining means, and means operated by movement of said detent for again enabling said retaining means.

9. In combination, a member adapted to be set to any one of a plurality of positions, a detent device adapted to yieldably retain said member in its set positions and to be oscillated as said member moves from one position to another, a contact device associated with said type carrying member, means effective to connect said contact device with a source of electrical energy, and means effective on oscillation of said detent device to break said connection.

10. In combination, a plurality of detent devices, a rod supporting said detent devices, a switch controlling device comprising a sleeve encircling said rod, a switch operating arm rigid with said sleeve, and an extension on said sleeve in the path of movement of all of said detents, whereby displacement of any one of said detents will rock said switch operating arm.

11. In combination, an element, adapted to occupy a plurality of positions, a detent adapted to yieldingly retain said element in position and to be oscillated by its movement from one position to another, and a switch operating device controlled by said detent.

12. In combination, an element adapted to occupy a plurality of significant positions, a detent device adapted to yieldingly retain said element in position and to be oscillated by its movement from one position to another, and an indicator controlling device operated by the oscillation of said detent.

In testimony whereof, I affix my signature hereto.

JOHN B. MILLS.